Inventor
CLARENCE JOHNSON
By Raymond W Jenkins
Attorney

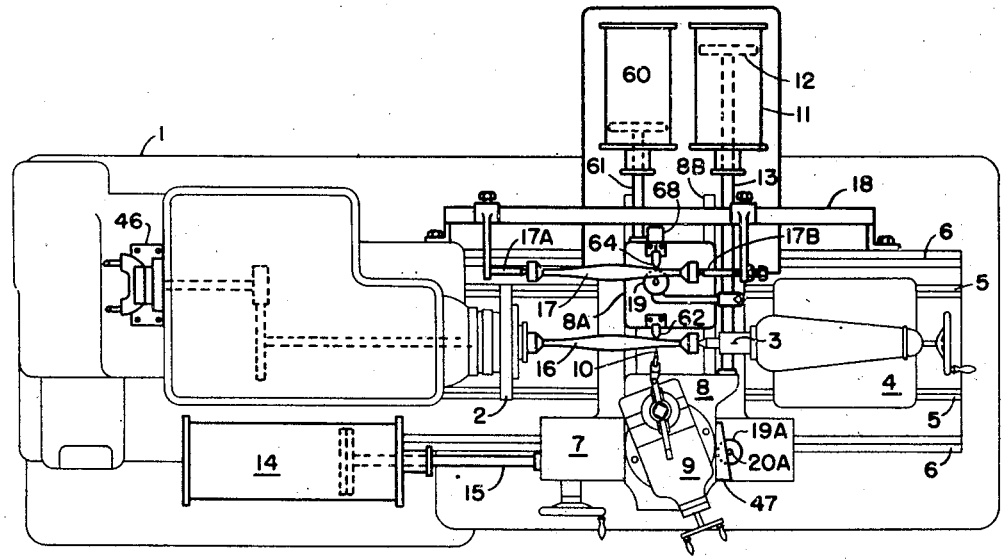

Patented June 24, 1947

2,422,682

UNITED STATES PATENT OFFICE 2,422,682

MACHINE TOOL CONTROL

Clarence Johnson, South Euclid, Ohio, assignor to Bailey Meter Company, a corporation of Delaware Application May 27, 1944, Serial No. 537,606

13 Claims. (Cl. 82—14)

This invention relates to duplicators for controlling the operation of a material forming machine so that a work piece is formed to a contour or configuration determined by a template, pattern, sample, or the like.

One of the objects of my invention is to improve the sensitivity of contour control of the type described and to thereby increase the accuracy with which the work piece is formed.

A further object of my invention is to provide a contour control of materially simpler construction than those now available.

In accordance with my invention the pattern or sample for producing the desired configuration on the work piece is scanned by a tracer regulating a jet of fluid discharged to the atmosphere from a nozzle. Variations in the shape of the sample cause corresponding changes in the rate of fluid discharged from the nozzle, which variations are then used to control the relative positioning of the tool and work piece.

Further, in accordance with my invention, changes in fluid pressure control the relative positioning of the tool and work piece through the agency of a hydraulic relay and servo-motor to the end that ample power is available for accurately positioning the tool relative to the work piece, or vice versa. The relative rates of movement of the tool and work piece in two or more directions are simultaneously controlled, so that the rate of cutting feed of the tool remains substantially constant regardless of changes in contour or profile of the template, pattern, or sample.

Obviously a duplicator or contour control of the type forming the subject matter of the present invention may be employed with material forming machines or machine tools of various types, such for example as milling machines, lathes, slotters, planers, die sinking machines, and other machines in which the relative feed between the tool and work may be suitably controlled. By way of example I illustrate and will describe my invention as applied to metal working lathes. Further applications and modifications of the invention will be readily apparent.

In the drawings:

Fig. 1 is a plan view of an engine lathe illustrating an application of my invention thereto.

Fig. 2 is a diagrammatic illustration of the pneumatic and hydraulic control circuits employed in the embodiment of my invention shown in Fig. 1.

Fig. 3 is a transfer valve arrangement of Fig. 2.

Figure 4:
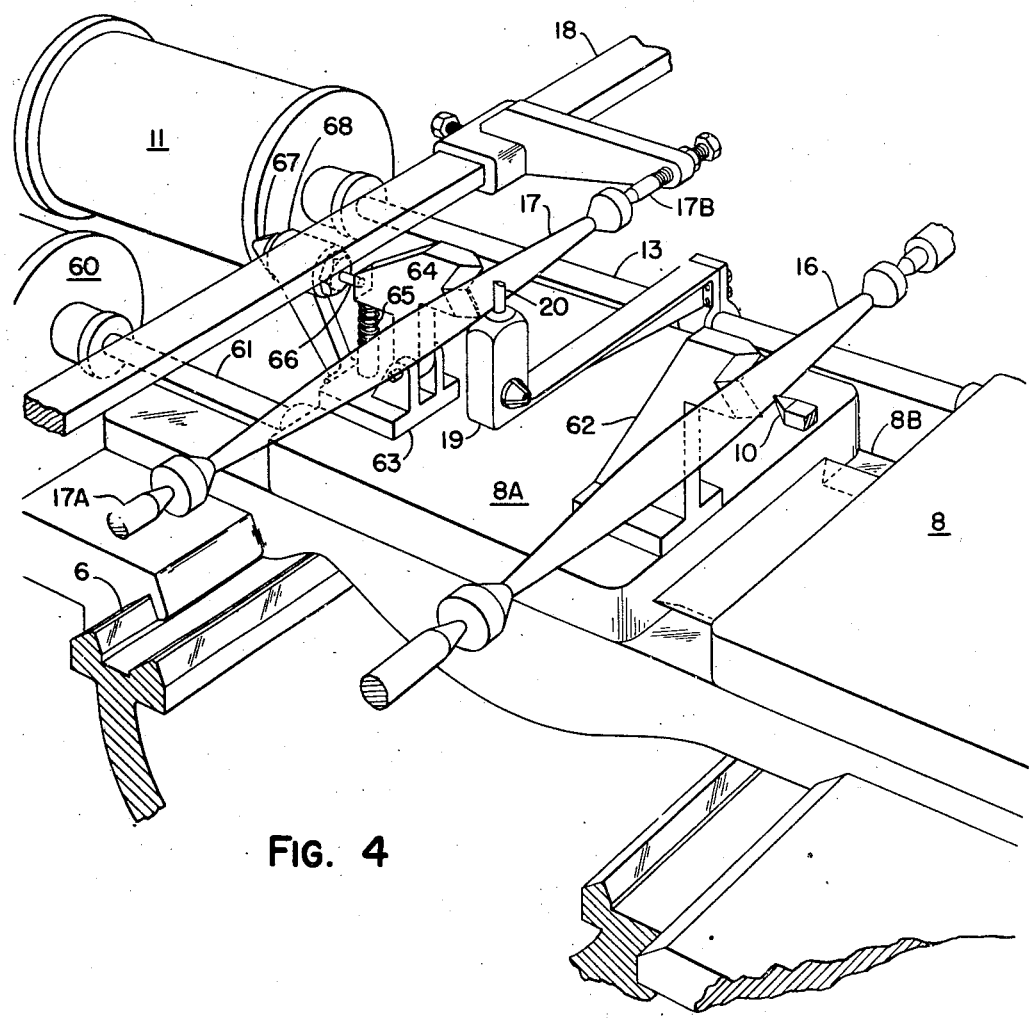
Fig. 4 is a perspective drawing of a portion of Fig. 1 to enlarged scale and somewhat more in detail.

As is well understood by those familiar with the art, in some machine tools such as lathes the tool is moved longitudinally and transversely of the work piece, which except for rotation about its center remains stationary. In other machine tools, such as some types of milling machines, the work piece may be moved in two directions, while the tool except for rotation about its axis remains stationary. In some other types of milling machines, and usually in die sinking machines, the tool may be moved in one or more directions and the work piece may also be moved in one or more directions. In all instances it will be observed, however, that it is the relative movement between the tool and work piece that causes the work piece to be formed to a desired shape. As a preferred embodiment I have chosen to illustrate and describe my invention incorporated in a lathe wherein the work piece, except for rotation about its center, remains stationary and the tool is moved transversely and longitudinally thereof. It will be evident that my invention is applicable to a wide variety of machine tools and that when I speak of relative movement between the tool and work piece I include either an arrangement where the tool is stationary and the work piece is moved, or where the work piece is stationary and the tool is moved, or a combination of the two.

Referring now to Fig. 1, I show my invention applied to an engine lathe 1 having a head stock 2 adapted to be rotated by any suitable means. A carriage 4 is movable longitudinally along the bed of the lathe in suitable ways 5 and supports the tail stock 3. Also movable longitudinally along the bed of the lathe in suitable ways 6 is a carriage 7 upon which are mounted cross-slides 8 and 8A both movable on ways 8B transversely of the carriage 7 and therefore of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 along the ways 8B through the agency of a piston rod 13. Longitudinal movements of the tool 10, that is movements of the tool parallel to the bed of the lathe in a longitudinal direction, are produced by means of a hydraulic cylinder 14 having an operating piston rod 15 which positions the entire carriage 7.

Supported by the head stock 2 and tail stock 3 is a work piece 16 which for illustrative purposes is shown as having been formed to a slender, tapered form by the tool 10. The particular shape has no significance, it being apparent as the description proceeds that by my invention the work piece may be formed automatically to almost any desired contour. The present invention is, however, particularly directed to the forming of work pieces of such a slenderness that during the machining operation the cutting pressure of the tool may cause sufficient deflection of the work piece as to throw considerable inaccuracy into the final product.

Furthermore, the present invention is concerned with the reproduction of work pieces from a sample or pattern rather than from a template or cam. Certain objects, such for example as fuel injection nozzles, can be roughly designed mathematically but in final form must be shaped to produce a result or calibration desired. Such shaping can usually only be accomplished by grinding, filing or turning as calibration proceeds until a shape or contour is obtained which will produce the desired result or calibration. Thereafter it is desired that this final contour or shape of the sample be reproduced upon numerous nozzles which are desirable to have the same calibration as the pattern or sample.

In Fig. 1 the sample 17 has the contour which it is desired to reproduce upon the work piece 16. The sample 17 is mounted upon centers 17A and 17B in axial parallelism with the work piece 16 and in transverse alignment therewith.

For contacting and following the contour of the sample 17 I provide a tracer assembly 19 movable with the cross-slide 8. As shown more clearly in Fig. 4, the tracer assembly 19 is clamped to and moved by the piston rod 13 which positions the cross-slide 8. The assembly 19 therefore moves transversely of the lathe with the tool 10. A vertical extension 20 of the tracer assembly 19 is adapted to contact tangentially what may be referred to as the front edge or profile of the sample 17. The construction and functioning of the tracer assembly 19 is illustrated, described and claimed in my copending application Serial No. 524,707. It is therefore not believed necessary to go into any considerable detail herein, but suffice it to say that movement of the tracer arm 20 relative to the housing of the assembly 19 controls the bleed to atmosphere of a jet of air from a nozzle and that such variable bleed results in a positioning of the piston rod 13 thereby restoring the relationship between the housing 19 and tracer arm 20 to return the bleed to a predetermined or normal value.

The tracer arm 20 continually scans the forward edge of the sample 17 and controls the bleed to atmosphere of a substantially constant pressure supply of compressed air. The variable bleed or rate of flow of air to the atmosphere produces corresponding changes in back pressure, or pressure of the air in the pipe 25 effective to cause a positioning of the piston rods 13 and 15 for transverse and longitudinal movements respectively of the tool 10.

In Fig. 2 I have shown diagrammatically the pneumatic and hydraulic circuits for controlling the servo-motors 11 and 14 by the tracer 19 in such manner that the motor 11 will position the cross-slide 8, and consequently the tool 10, transversely of the lathe, or in other words toward or away from the work piece 16 as the tool is traveling longitudinally. The action is such that if the contacted edge of the pattern 17 is a straight line parallel to the axis of the work piece 16 then the work piece 16 will be turned to cylindrical form. If the contacted edge of the pattern 17 is a straight line, but inclined relative to the axis of the work piece 16, then the work piece 16 will be shaped to a taper. The particular showing of Fig. 1 on the contacted edge of the pattern 17 is the form which is to be reproduced on the work piece 16.

Air under pressure from any convenient source is passed through a pressure regulator 22 and volume chamber 23 to a header 24 from which a branch 25 leads through an orifice 26 to the tracer assembly 19. As the discharge from the tracer 19 to the atmosphere varies, the pressure in the branch 25 between the orifice 26 and the tracer assembly 19 will vary and such controlled air pressure representative of changes in contour of the sample 17 is effective upon a bellows 27 of a pilot valve assembly 28 and simultaneously upon a bellows 29 of a fluid resistance assembly 30. The pilot valve assembly 28 and fluid resistance 30 are more fully illustrated, described and claimed in the copending applications of Frederick A. Barnes, Serial No. 524,705 and of Clarence Johnson, Serial No. 524,707.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. In the pipe 36 I show a hand adjustable valve 38 for variably throttling the flow of oil therethrough and thus controlling the basic rate of travel of the piston rod 13.

In connection with the hydraulic motor 14 and adjustable fluid resistance assembly 30 I provide switching valves 39 and 40 arranged to be moved together to either of a "normal" or a "rapid traverse" position of operation. The valves 39 and 40 are shown in Fig. 2 in the "normal" operating position. Oil under pressure from the pump 31 is forced through a pipe 41, the valve 40 and a pipe 43 to one end of the hydraulic motor 14. Oil from the other end of the motor passes through a pipe 42, the valve 40, the valve 39, the pipe 44, the adjustable fluid resistance 30 and the pipe 45 to the sump 33. The regulation of the variable resistance 30 determines the rate of flow of oil through the pipe 42, and consequently the rate of travel of the piston rod 15 toward the left in the drawing. Thus the rate of longitudinal travel of the tool 10 along the work piece 16 is controlled by the variable resistance 30 to passage of oil therethrough from the left-hand end of the motor 14.

In Fig. 3 I show the passage relation of the switching valves 39, 40 for a "rapid return" of the piston rod 15 from left to right of Fig. 2. That is, for a rapid return of the tool 10 to the beginning of its working travel. Oil from the pump 31 passes directly through the pipe 41, the valve 40 and the pipe 42; while oil from the right hand end of the motor 14 passes directly through the pipe 43, valve 40, valve 39 to the pipe 45 and sump 33. Thus on the rapid return of the piston rod 15 there is no throttling of its speed of travel by the variable resistance 30, and thus the tool is traversed to the right at maximum speed.

In general, the operation of the system illustrated in Figs. 1, 2 and 3 is as follows. The air pressure established within the pipe 25 is such that the bellows 27 and 29 (and the movable parts of the assemblies 28, 30 positioned thereby) provide a normal condition of operation. The pilot valve assembly 28 locks oil from the pipes 35, 36 so that the piston rod 13 is not moving and the tool 10 travels a cutting path parallel to the axis of the work piece 16. At the same time the variable fluid resistance 30 is in a position to provide a normal speed of travel of the piston rod 15 from right to left on the drawing, thus moving the tool 10 along the work at a uniform normal speed.

If the profile of the sample 17 recedes from the axis of the work piece or advances toward the axis of the work piece the air pressure within the pipe 25 is correspondingly varied in proper direction to increase or decrease the air pressure within the bellows 27 and 29 and to cause a corresponding positioning of the movable element of the pilot valve 28 and fluid resistance 30. Such movement causes the hydraulic motor 11 to position the tool toward or away from the axis of the work piece 16 and thus reproduce upon the work piece 16 the contour of the sample 17. At the same time any departure (in either direction) of the movable element of the variable resistance 30 from normal position will increase the resistance to oil passage therethrough and tend to slow up the rate of travel of the piston rod 15. Thus longitudinal travel of the tool 10, from right to left on the drawing, will be at a speed slower than the normal speed depending upon the rate of travel of the tool 10 toward or away from the axis of the work piece 16. If, for example, the profile of the sample 17 includes a shoulder at right angles with the axis of the work piece 16 then there will be a complete stoppage of longitudinal travel of the tool 10 while the tool is advancing directly toward the axis of the work piece or is receding directly therefrom. Movement of the tracer arm 20 either toward or away from the contact edge of the sample 17 from a neutral or normal position results in a decrease in speed of travel of the tool 10 in a longitudinal direction from its normal speed of travel and irrespective as to whether the tool is advancing toward the axis of the work piece or is receding therefrom.

After complete travel of the tool has been accomplished from right to left then a rapid return of the tool to the right or starting point may be accomplished by moving the switching valves 39, 40 to the position shown in Fig. 3 wherein the connections to the cylinder 14 are reversed and the variable restriction 30 is made non-effective.

The system which I have just described in connection with Figs. 1, 2 and 3 is in general a two-element control wherein the lathe tool is positioned both transversely and longitudinally of the work piece. It will, of course, be seen that either element may be employed without necessarily employing the second element. For example, a lathe or smilar material forming machine may have the tracer assembly 19 control only the cross-feed of the tool, or only the longitudinal speed of the tool, or the two combined as I have just described. It may however, in certain instances, be desirable to include a third element, namely, a control of the speed of rotation of the work piece 16 so that the linear cutting speed of the tool will remain constant regardless of the diameter of the work piece at which the tool is cutting. In other words, so that the speed of rotation of the work piece 16 will be different when the tool 10 is cutting at a larger diameter than it is when the tool is cutting at a smaller diameter. To illustrate such a possibility I have indicated on Fig. 1 an oil motor 46 for rotating the work 16 and under the control of a tracer assembly 19A which may be mounted on and longitudinally moved with the carriage 7. On the cross-slide 8 I locate a cam surface 47 movable with the tool 10 relative to the tracer arm 20A of the tracer assembly 19A so that the tracer arm 20A is deflected by the cam 47 an amount indicative of the transverse position of the tool 10 relative to the axis of the work piece 16.

As explained in connection with Fig. 2 the tracer assembly 19A may control a variable fluid restriction 30A in the supply line 48 leading from the pump 31 to the motor 46 or in the discharge line 49 between the motor 46 and the sump 33 so that the speed of the motor 46 will depend entirely upon the position of the tracer arm 20A relative the assembly 19A, and consequently will depend upon the transverse location of the cutting tool 10. The tracer assembly 19A is connected to the air header 24 through a branch 50 and applies a regulated air pressure to the bellows 51 of the fluid restriction assembly 30A, such pressure bearing a definite relation to the transverse position of the tool 10 relative the axis of the work piece 16.

In other words, as the diameter at which the tool 10 is cutting increases or decreases the speed of rotation of the work piece 16 will correspondingly decrease or increase respectively. It will be apparent that this third element of control may be included on the lathe of Figs. 1, 2 and 3 either alone or in combination with either or both of the two elements of transverse and longitudinal tool travel.

I have mentioned one principal feature of the present invention, namely, the use of an actual sample 17 as a pattern or template to which the work piece is desirable to correspond. A second principal feature is the provision of a travel-rest for both the work piece and the sample when they are of a relatively long, slender shape and thus susceptible to deflection or bending under the cutting pressure of the tool.

As illustrated somewhat diagrammatically in Fig. 1 and in perspective in Fig. 4 I show a second cross-slide 8A positionable along the ways 8B independently of the movement or positioning of the cross-slide 8 along the ways 8B. It will be evident that with the ways 8B formed on the carriage 7 then the cross-slides 8 and 8A are both positionable longitudinally of the lathe bed simultaneously and with the tool 10.

Referring now in particular to Fig. 4, it will be observed that the cross-slide 8A is positionable along the ways 8B transversely of the work piece 16 and sample 17 through the agency of a hydraulic servo-motor 60 and piston rod 61. Supported from the auxiliary cross-slide 8A is a travel-rest 62 having a blunt edged V projection adapted to engage the curvature of the work piece substantially in line or slightly behind the plane of contact of the cutting tool 10. The arrangement provides a steady rest or backing for the work substantially in line with the cutting tool for absorbing cutting pressure of said tool and preventing undesirable deflection of the work 16 due to such cutting pressure. I term the steady rest 62 a travel rest, as it is adapted to travel longitudinally of the work with the carriage 7 and to move transversely relative to the axis of the work through the agency of the servomotor 60.

Also mounted on the cross-slide 8A is a pedestal 63 to which is pivotally mounted a guide rest or member 64 adapted to normally present a blunt edged V block against the back edge of the sample 17 substantially in line with the tracer arm 20. A spring 65 tends to hold the travel block or member 64 in contact with the sample 17. Positionable by and with the block 64 is the stem 66 of a nozzle 67 discharging air to the atmosphere at a rate dependent upon the position of the nozzle 67 relative to its housing 68. Inasmuch as the housing 68 is supported by and with the cross-slide 8A it is evident that any movement of the rest 64 about its pivot against the action of the spring 65 will result in a variable bleed of air through the nozzle 67 as indicative of the relative position of the block 64 and cross-slide 8A and thereby of the relation between position of the rests 62 and 64. If the V edges of the rests 62, 64 are in a predetermined spacing, then a normal rate of discharge of air from the nozzle 67 will be had. As the spacing between the rests 62 and 64 either increases or decreases, the rate of flow of air through the nozzle 67 will be varied in predetermined manner.

Referring to Fig. 2, the nozzle assembly 67, 68 controls the pressure in a pipe 69 leading to a bellows 70. The bellows 70 in turn positions a pilot valve 71 for control of the servo-motor 60 and piston rod 61. As previously mentioned, the servo-motor 60 moves the cross-slide 8A along the ways 8B through the agency of piston rod 61.

Preferably the tool 10, the rest 62, the tracer arm 20, the rest 64 and the nozzle 67 are substantially in line normal to the parallel axes of the work 16 and sample 17. The tool 10 and tracer assembly 19 are positioned together by the cross-slide 8. The rests 62, 64 and bleed nozzle 68, 67 are positioned together by the cross-slide 8A. A changing contour of the sample 17 deflects the tracer arm 20 relative to the assembly 19 and through the pneumatic and hydraulic means previously described causes the servo-motor 11 to position the tool 10 and housing 19 until the tool 10 is cutting a diameter in conformity with the diameter of the sample to which the tracer arm 20 is sensitive. Simultaneously movement of the tracer housing 19 restores the rate of bleed to atmosphere of the discharge device of assembly 19, 20 to the predetermined or normal value and stops further transverse motion of the tool.

A change in diameter of the sample 17 pivotally moves the rest block 64 about its base 63 and positions the pilot stem 66 to vary the rate of flow of air to atmosphere from the nozzle 67. Such variation in air bleed causes the servo-motor 60 (through the piston rod 61) to so position the cross-slide 8A as to restore the relation of the pilot stem 66 within the housing 68 to a normal or predetermined bleed value and simultaneously to position the travel rest 62 representative of the diameter contacted by the rest 64.

In general the tool 10 is continuously positioned relative to the axis of the work 16 in accordance with the position of the tracer arm 20 relative to the axis of the sample 17. The steady rest 62 is positioned relative to the axis of the work 16 in accordance with the position of the rest 64 relative to the axis of the sample 17. Thus the tool is arranged to reproduce upon the work piece the contour of the sample and at the same time the steady rest 62 is in the proper position to back up or oppose the cutting pressure of the tool 10 to prevent undesirable distortion or deflection of the work 16 which otherwise might cause inaccuracy of the reproduction of the contour of the sample upon the work piece.

It will be apparent that I have illustrated and described only a preferred arrangement. For example, I may readily arrange to rotate the sample 17 in unison with the work piece 16. Such arrangement would be desirable if the cross section taken at any point along the surface of the sample 17 is other than circular. For example, such cross section might be an ellipse, in which event rotation of the sample 17 with rotation of the work piece 16 would result in a reproduction of the elliptical cross section upon the work piece 16.

If the cross section of the sample 17 is other than a circle at any or all longitudinal points, then desirably the sample 17 may be rotated with the work 16. Thus an elliptical or similar cross section sample may be reproduced, and in fact a square, triangular, or other cross section sample may be reproduced in the work piece 16 having proper regard for the rate of rotation of the work and sample, the rate of longitudinal travel, the shaping and sharpening of the tool, etc. In other words, the speed and speed of response of the various moving parts may be considerably different in turning a piece having a square cross section than in turning one having a cylindrical cross section.

For the construction, operation and advantageous features of the tracers 19 and 19A, as well as the air bleed valves 67 and 68, the pilot valves 28 and 71 as well as the variable fluid restrictions 30 and 30A, reference may be had to my copending application, Serial No. 524,707, and to the copending application of Frederick A. Barnes, Serial No. 524,705.

While I have illustrated and described certain preferred embodiments of my invention it will be understood that they are by way of example only and that I am not to be limited thereto except as defined in the following claims.

What I claim as new, and desire to secure by Letters Patent of the United States, is:

1. In a lathe having a relatively movable tool and work piece, in combination, a sample having the desired shape of the work piece and positioned in predetermined relation with respect to the work piece in the lathe, a tracer arranged to scan the sample as the tool traverses the work piece, motive power means under the control of said tracer to relatively move the tool and work piece, a travel rest adapted to move longitudinally of the work piece and continuously back-up the work piece substantially in line with the cutting edge of the tool, a travel member adapted to continuously scan the sample in line with said travel rest, and means under the control of said member for urging the travel rest against the work piece to oppose tool cutting pressure.

2. In a lathe having a relatively movable tool and work piece, in combination, a sample having the desired shape of the work piece and positioned in predetermined relation with respect to the work piece in the lathe, a tracer arranged to scan the sample as the tool traverses the work piece, motive powed means under the control of said tracer to relatively move the tool and work piece, a travel rest adapted to travel with the tool longitudinally of the work piece and continuously back-up the work piece substantially in line with the cutting edge of the tool, a travel member adapted to continuously scan the sample in line with said travel rest, and means under the control of said travel member urging the travel rest against the work piece at substantially uniform pressure to oppose tool cutting pressure.

3. In a lathe having a relatively movable tool and work piece, in combination, a sample having the desired shape of the work piece and supported in substantial axial parallelism with the work piece, a carriage positionable longitudinally of the sample and work piece, a first and a second cross-slide movable on said carriage transversely relative the sample and work piece, and a first and a second means continuously scanning the sample as the tool traverses the work piece and separately controlling the positioning of the said two cross-slides on the carriage.

4. The combination of claim 3 including in combination therewith separate power means for each of said cross-slides under the control of said scanning means.

5. The combination of claim 3 including in combination therewith separate power means for each of said cross-slides and a third power means for longitudinally moving the carriage, all three power means under the control of said scanning means.

6. The combination of claim 3 including fluid pressure power means adapted to position the cross-slides on the carriage and to position the carriage longitudinally of the work piece and sample.

7. In a lathe having a relatively movable tool and work piece, in combination, a sample having the desired shape of the work piece and supported in substantial axial parallelism with the work piece, a tracer arranged to scan the sample as the tool traverses the work piece, a carriage positionable longitudinally of the sample and work piece, a first cross-slide on said carriage and supporting said tool and said tracer, a first power means under the control of said tracer for positioning said first cross-slide transversely of the carriage, a second cross-slide on said carriage, a travel rest supported on and carried by the second cross-slide and arranged to back-up the work piece substantially in line with the cutting-edge of the tool to oppose tool cutting pressure, a second tracer carried by said second cross-slide and scanning the sample adjacent the first tracer, a second power means under the control of said second tracer for positioning said second cross-slide transversely of the carriage, and a third power means adapted to position the carriage longitudinally of the work piece under the control of one of said tracers.

8. The combination of claim 7 wherein said power means are fluid pressure servo-motors.

9. In a lathe having a relatively movable tool and work piece, in combination, a sample having the desired shape of the work piece and positioned in predetermined relation with respect to the work piece in the lathe, a tracer arranged to scan the sample as the tool traverses the work piece, the sample and work piece supported in axial parallelism, a carriage positionable longitudinally of the sample and work piece, a first cross-slide on said carriage and supporting said tool and said tracer, power means under the control of said tracer for transversely positioning said first cross-slide, a second cross-slide on said carriage, a travel rest supported on said second cross-slide and arranged to back-up the work piece substantially in line with the cutting edge of the tool, separate power means positioning said second cross-slide on said carriage to urge the travel rest against the work piece at substantially uniform pressure to oppose tool cutting pressure, and means continuously scanning said sample and controlling said separate power means.

10. The combination of claim 9 wherein said power means and said separate power means are fluid pressure operated.

11. In a lathe having a relatively movable tool and work piece, in combination, a sample having the desired shape of the work piece and positioned in predetermined relation with respect to the work piece in the lathe, a tracer mechanism including an air jet discharging to the atmosphere from a normally constant pressure source and arranged to scan the sample as the tool traverses the work piece, a first power means under the control of the tracer mechanism air jet pressure to relatively move the tool and work piece, a travel rest adapted to travel in a path conforming to the shape of said sample and continuously back-up the work piece substantially in line with the cutting edge of the tool, a travel member adapted to continuously scan the sample in line with said travel rest, and a second power means under the control of said travel member urging the travel rest against the work piece at substantially uniform pressure to oppose tool cutting pressure.

12. In a lathe having a relatively movable tool and work piece, in combination, a pattern having the desired shape of the work piece, a tracer mechanism arranged to scan the pattern as the tool traverses the work piece and including a device controlling the discharge of fluid to the atmosphere from a normally constant pressure source, power means responsive to variations in fluid pressure between the source and the controlling device adapted to relatively move the tool and work piece, a travel rest adapted to travel with the tool longitudinally of the work piece in a path conforming to the shape of said sample and continuously back-up the work piece substantially in line with the cutting edge of the tool, a travel member adapted to continuously scan the sample in line with said travel rest, and other means under the control of said travel member for urging the travel rest against the work piece at substantially uniform pressure to oppose tool cutting pressure.

13. In combination with a lathe having means for rotating a work piece at desired speed, and a sample having the desired shape of the work piece and supported in axial parallelism therewith, a carriage positionable longitudinally of the sample and work piece, a first cross-slide mounted on the carriage and adapted to be moved transversely thereof, a cutting tool mounted on the first cross-slide, a second cross-slide mounted on the carriage and adapted to be moved transversely thereof and relative to the first cross-slide, a travel rest secured to the second cross-slide and arranged to move in contact with said work piece in continuous opposition to the pressure exerted by the cutting tool, a guide rest mounted on the second cross-slide and resiliently urged into contact with said sample, means responsive to relative changes of position of the guide rest with respect to said sample and including a motor for positioning the travel rest relative to the work piece, a tracer secured to the first cross-slide and arranged to scan the sample as the tool traverses the work piece, and means under the control of said tracer for positioning the cutting tool relative to the work piece.

CLARENCE JOHNSON.

REFERENCES CITED

The following references are of record in the file of this patent:

UNITED STATES PATENTS

| Number | Name | Date |
|---|---|---|
| 181,154 | Dyer | Aug. 15, 1876 |
| 2,313,849 | Turchan et al. | Mar. 16, 1943 |
| 287,548 | King | Oct. 30, 1883 |
| 2,069,426 | Smith | Feb. 2, 1937 |
| 1,961,091 | Smith et al. | May 29, 1934 |